United States Patent
Fawcett

(10) Patent No.: US 10,614,018 B2
(45) Date of Patent: Apr. 7, 2020

(54) MANAGING A SET OF COMPUTE NODES WHICH HAVE DIFFERENT CONFIGURATIONS IN A STREAM COMPUTING ENVIRONMENT

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/168,046

(22) Filed: May 28, 2016

(65) Prior Publication Data

US 2017/0344387 A1    Nov. 30, 2017

(51) Int. Cl.
G06F 13/40 (2006.01)
G06F 9/448 (2018.01)
G06F 9/50 (2006.01)

(52) U.S. Cl.
CPC ........ G06F 13/4068 (2013.01); G06F 9/4494 (2018.02); G06F 9/5083 (2013.01)

(58) Field of Classification Search
CPC ....... H04L 65/00–80; H04L 67/00–141; H04L 29/02–06285; G06F 9/44–4494; G06F 9/50–5088; G06F 13/40–4068
See application file for complete search history.

(56) References Cited

U.S. PATENT DOCUMENTS

| | | | |
|---|---|---|---|
| 8,255,554 B2 | 8/2012 | Andrade et al. | |
| 8,490,072 B2 | 7/2013 | Andrade et al. | |
| 8,806,510 B2 | 8/2014 | Andrade et al. | |
| 9,727,848 B2 * | 8/2017 | Bligh | G06Q 20/14 |
| 9,800,517 B1 * | 10/2017 | Anderson | H04L 47/70 |
| 9,888,057 B2 | 2/2018 | Fawcett | |
| 9,900,374 B2 | 2/2018 | Fawcett | |
| 9,965,262 B2 | 5/2018 | Fawcett | |
| 9,965,264 B2 | 5/2018 | Fawcett | |
| 2014/0380289 A1 * | 12/2014 | Kalogeropulos | G06F 8/443 717/152 |

(Continued)

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>.

*Primary Examiner* — Clayton R Williams
(74) *Attorney, Agent, or Firm* — Robert C. Bunker

(57) ABSTRACT

Disclosed aspects relate to managing a set of compute nodes for processing a stream of tuples using a set of processing elements. The set of compute nodes is structured to include both a first compute node having a first configuration and a second compute node having a second configuration. The first configuration differs from the second configuration. Based on the first configuration and the set of processing elements which includes a first processing element, a determination is made to establish the first processing element on the first compute node and the first processing element is established on the first compute node. In embodiments, based on the second configuration and the set of processing elements which includes a second processing element, a determination is made to establish the second processing element on the second compute node and the second processing element is established on the second compute node.

17 Claims, 10 Drawing Sheets

(56) References Cited

U.S. PATENT DOCUMENTS

| | | | |
|---|---|---|---|
| 2015/0113539 A1* | 4/2015 | Agarwal | G06F 9/5027 718/104 |
| 2015/0199214 A1* | 7/2015 | Lee | G06F 9/505 718/102 |
| 2016/0342405 A1 | 11/2016 | Fawcett | |
| 2016/0342659 A1 | 11/2016 | Fawcett | |
| 2016/0344786 A1 | 11/2016 | Fawcett | |
| 2016/0344799 A1 | 11/2016 | Fawcett | |
| 2016/0344811 A1 | 11/2016 | Fawcett | |
| 2016/0344843 A1 | 11/2016 | Fawcett | |

* cited by examiner

MANAGING A SET OF COMPUTE NODES WHICH HAVE DIFFERENT CONFIGURATIONS IN A STREAM COMPUTING ENVIRONMENT

BACKGROUND

This disclosure relates generally to computer systems and, more particularly, relates to managing a set of compute nodes which have different configurations in a stream computing environment. The amount of stream computing data that needs to be managed by enterprises is increasing. Management of compute nodes in stream computing environments may be desired to be performed as efficiently as possible. As stream computing data needing to be managed increases, the need for management efficiency may increase.

SUMMARY

Aspects of the disclosure relate to managing and supporting stream computing/processing application execution across a set of compute nodes with different configurations. Various performance or efficiency benefits may result from running such applications on heterogeneous compute nodes rather than simply homogeneous compute nodes. For example, the different configurations may include different operating systems, different versions of operating systems, different hardware architectures, different algorithms based on computing capabilities of the respective compute nodes, different application bundles, or the like. The different configurations may provide performance or efficiency benefits for running stream computing/processing applications in cloud computing environments.

Aspects of the disclosure relate to managing a set of compute nodes for processing a stream of tuples using a set of processing elements. The set of compute nodes is structured to include both a first compute node having a first configuration and a second compute node having a second configuration. The first configuration differs from the second configuration. In embodiments, the different configurations may include different operating systems, different versions of operating systems, different hardware architectures, different algorithms based on computing capabilities of the respective compute nodes, different application bundles, or the like. Accordingly, the set of compute nodes can be considered heterogeneous in nature.

Based on the first configuration and the set of processing elements which includes a first processing element, a determination is made to establish the first processing element on the first compute node and the first processing element is established on the first compute node. In embodiments, based on the second configuration and the set of processing elements which includes a second processing element, a determination is made to establish the second processing element on the second compute node and the second processing element is established on the second compute node. Altogether, performance or efficiency benefits with respect to managing a set of compute nodes which have different configurations in a stream computing environment may occur.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
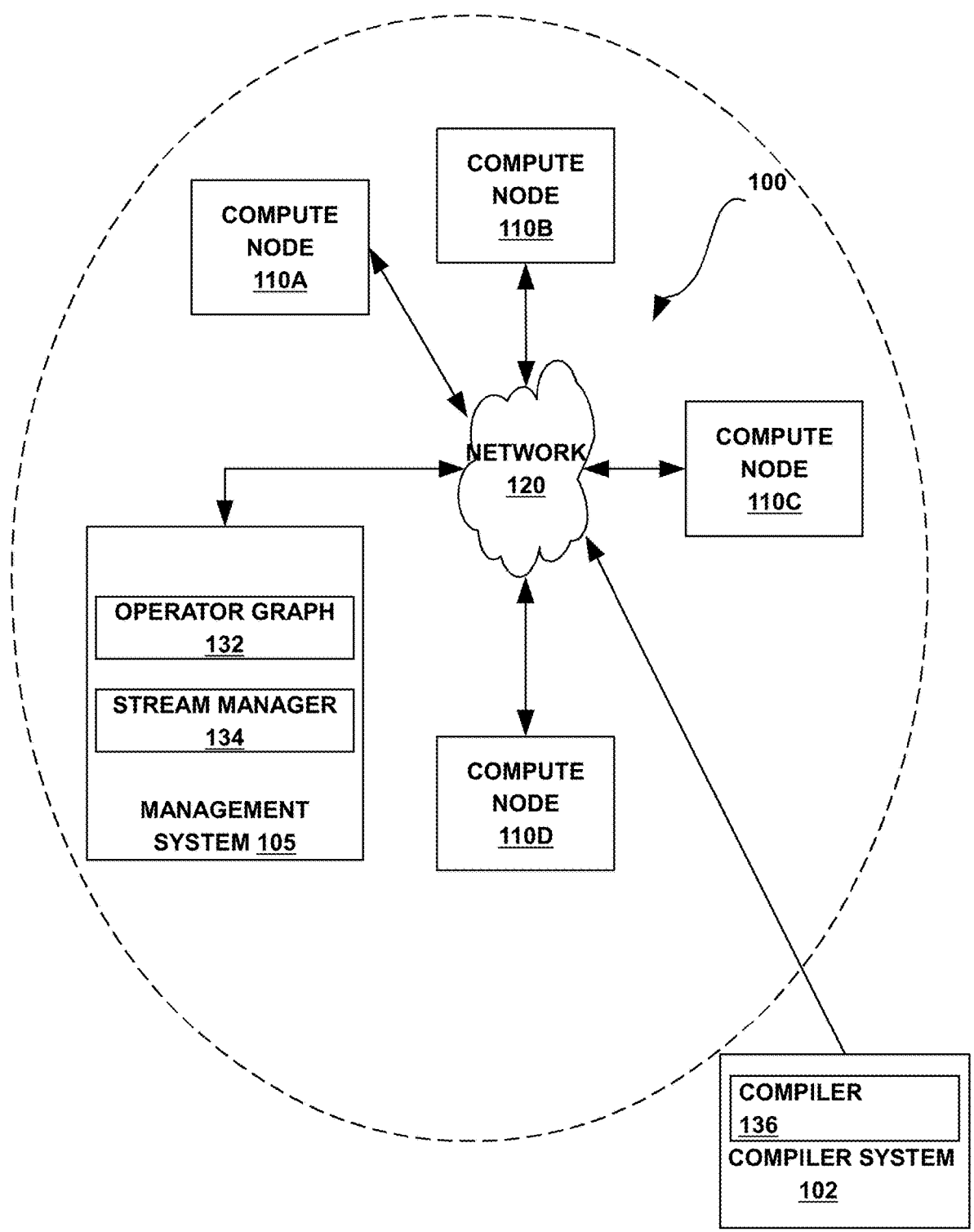
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing and supporting stream computing/processing application execution across a set of compute nodes with different configurations. Various performance or efficiency benefits may result from running such applications on heterogeneous compute nodes rather than simply homogeneous compute nodes. For example, the different configurations may include different operating systems, different versions of operating systems, different hardware architectures, different algorithms based on computing capabilities of the respective compute nodes, different application bundles, or the like. The different configurations may provide performance or efficiency benefits for running stream computing/processing applications in cloud computing environments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for managing a set of compute nodes for processing a stream of tuples using a set of processing elements. The set of compute nodes is structured to include both a first compute node having a first configuration and a second compute node having a second configuration. The first configuration differs from the second configuration. In embodiments, the different configurations may include different operating systems, different versions of operating systems, different hardware architectures, different algorithms based on computing capabilities of the respective compute nodes, different application bundles, or the like. Accordingly, the set of compute nodes can be considered heterogeneous in nature.

Based on the first configuration and the set of processing elements which includes a first processing element, a determination is made to establish the first processing element on the first compute node and the first processing element is established on the first compute node. In embodiments, based on the second configuration and the set of processing elements which includes a second processing element, a determination is made to establish the second processing element on the second compute node and the second processing element is established on the second compute node. Altogether, performance or efficiency benefits with respect to managing a set of compute nodes which have different configurations in a stream computing environment may occur (e.g., speed, flexibility, resource usage, productivity). Aspects may save computing resources such as bandwidth, disk, processing, or memory.

FIG. 1 illustrates one exemplary computing infrastructure 100 that may be configured to execute a stream computing application, according to some embodiments. The computing infrastructure 100 includes a management system 105 (which can include an operator graph 132 and a stream manager 134) and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
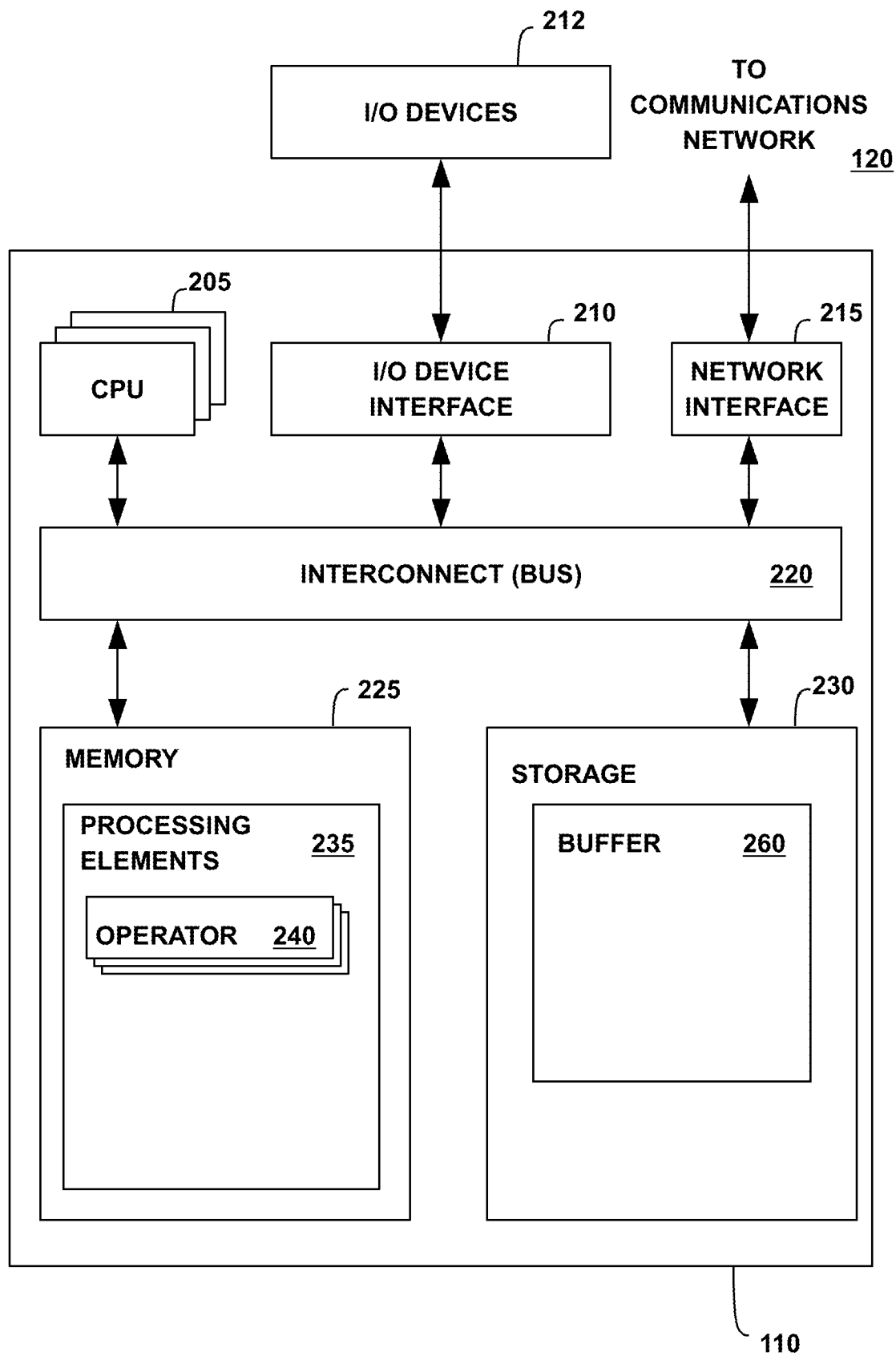
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
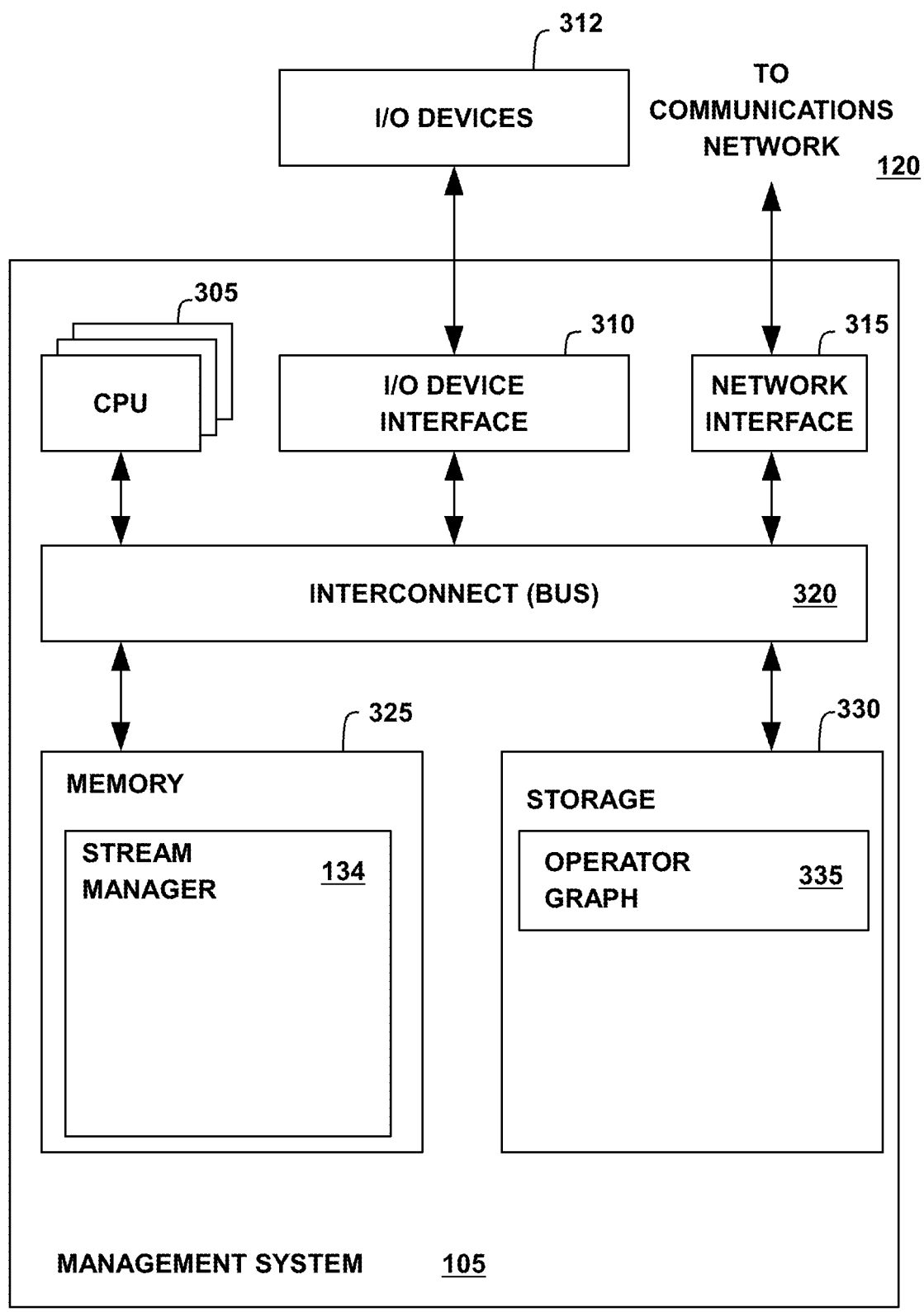
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function. Portions of stream manager 134 or operator graph 335 may be stored in memory 325 or storage 330 at different times in various embodiments.

Figure 4:
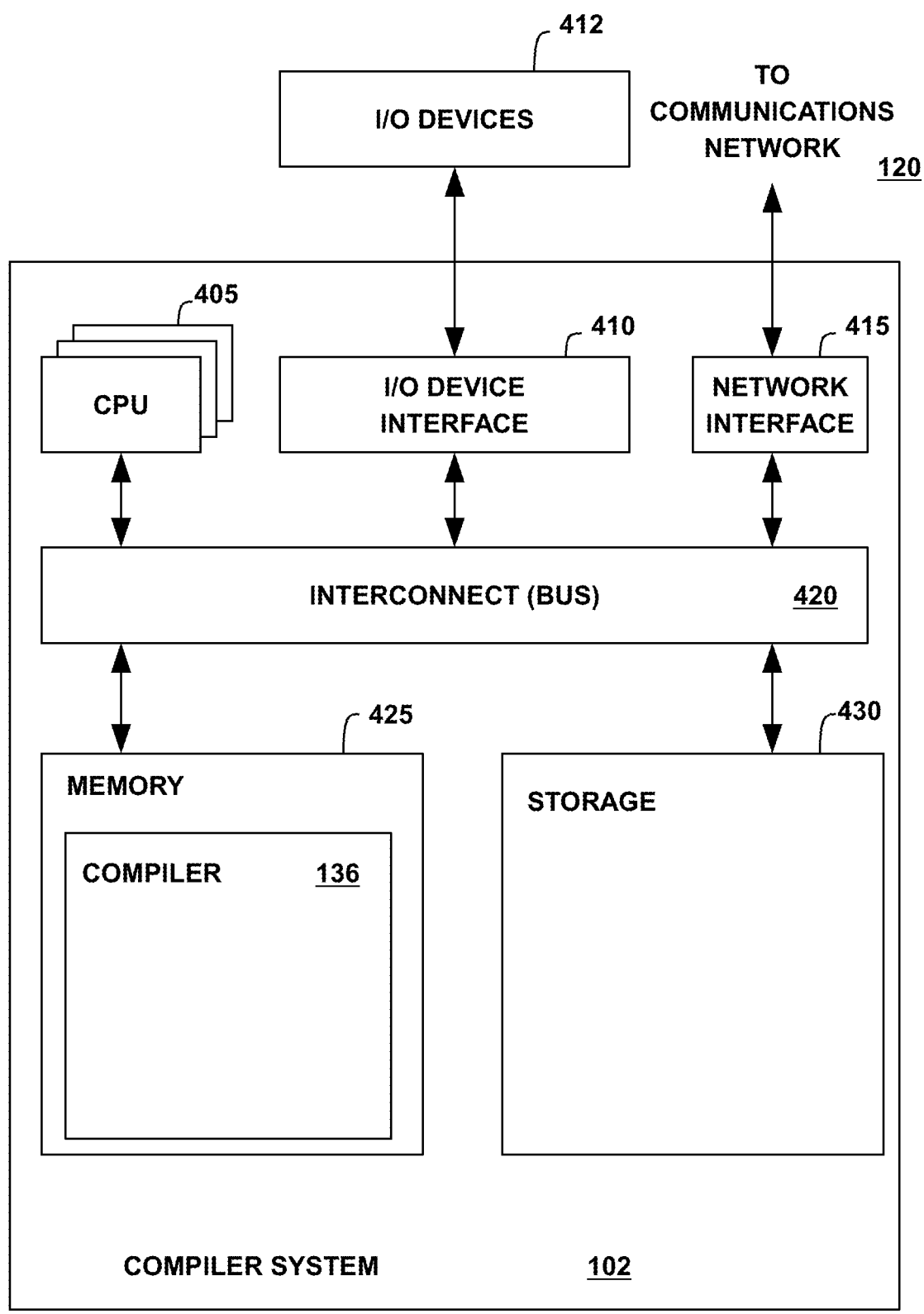
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

Figure 5:
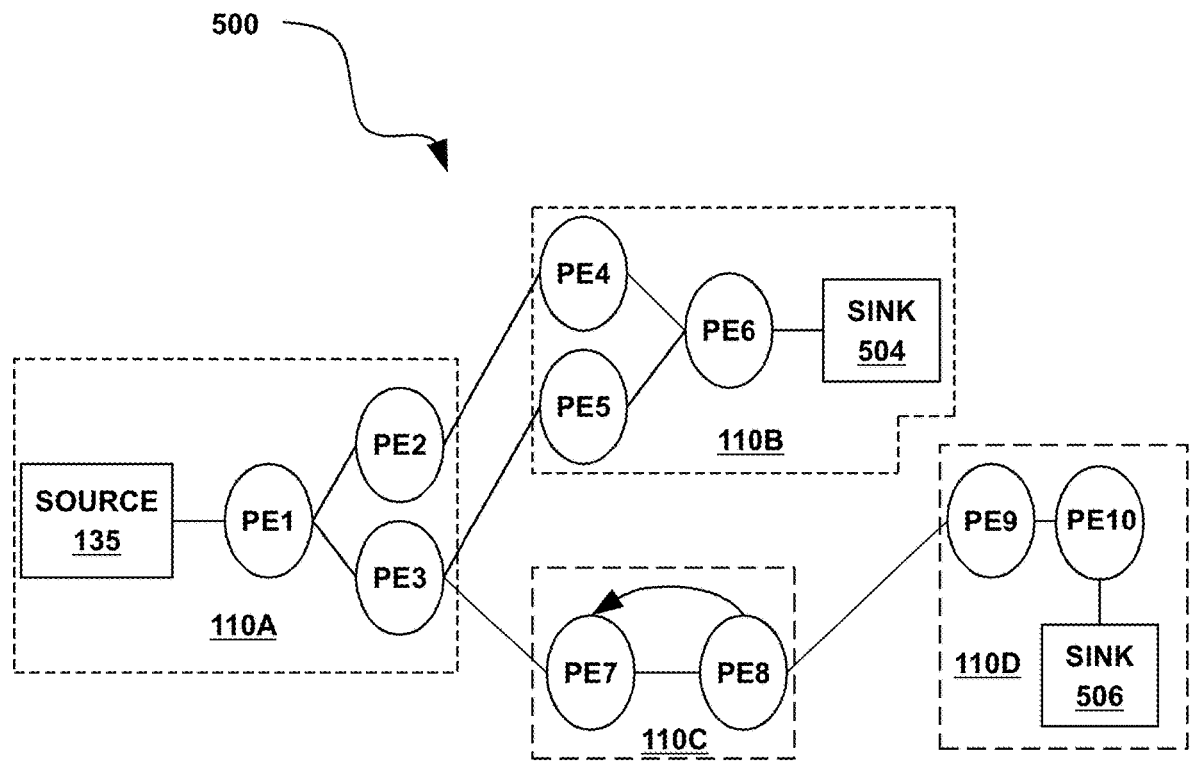
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 and to operator sink 504. Similarly, tuples flowing from PE3 to PE5 and to PE6 also reach the operators in sink 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
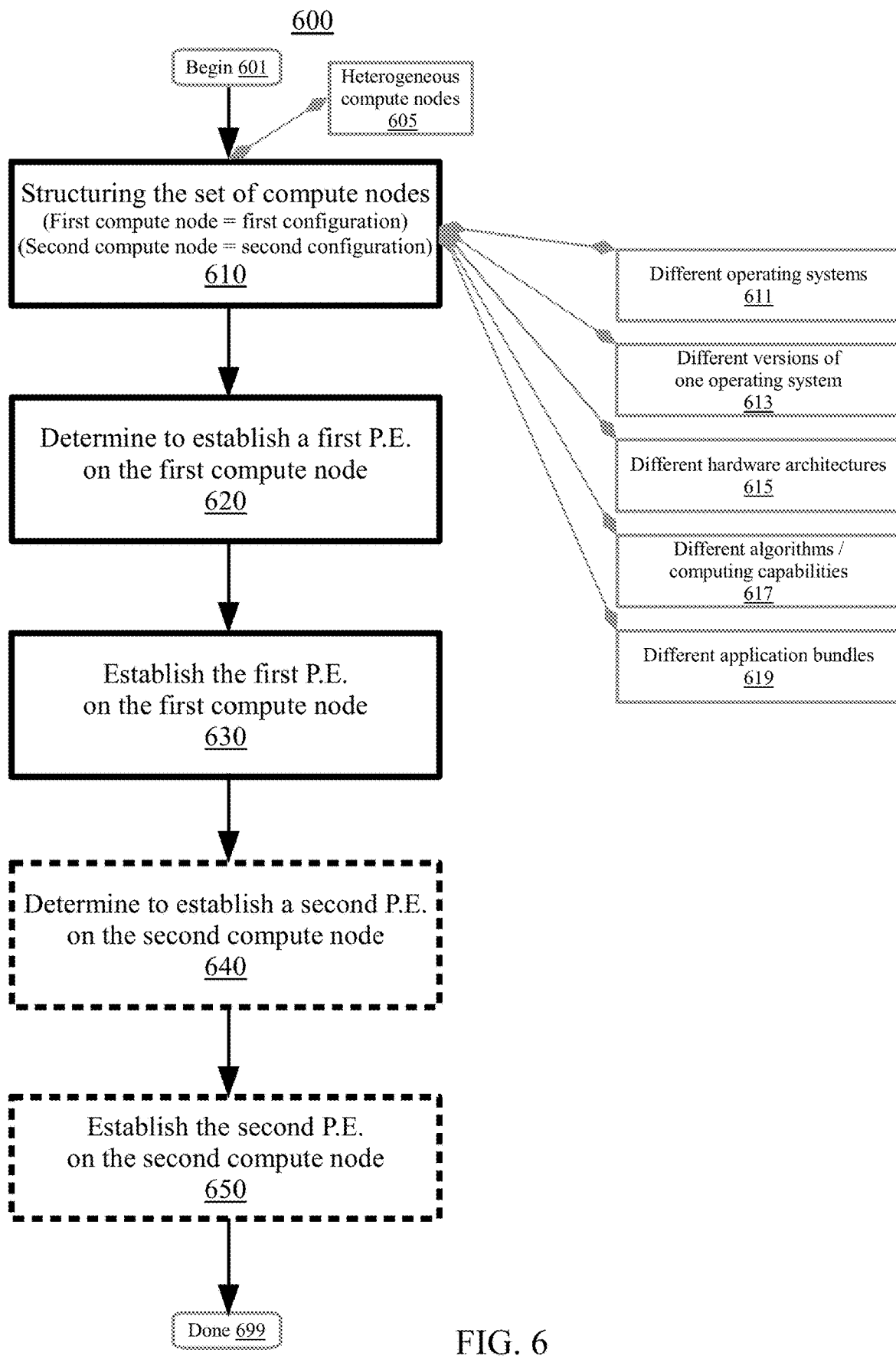
FIG. 6 is a flowchart illustrating a method for managing a set of compute nodes for processing a stream of tuples using a set of processing elements, according to embodiments.

FIG. 6 is a flowchart illustrating a method 600 for managing a set of compute nodes for processing a stream of tuples using a set of processing elements, according to embodiments. In order for the set of processing elements to be executed on the set of compute nodes, an executable code image for a job (application bundle) may be made available to a specific compute node. Other than job submission, application bundle management may also be performed when a processing element gets moved to a new compute node. Typical reasons for why processing elements get moved to new compute nodes are for load-balancing purposes, or for failover scenarios when a host goes down. If the new compute node does not have the application bundle available, then it can be provisioned there (e.g., retrieved for installation). Application bundles can be relatively large, so there is a measurable cost of moving/storing application bundles. Aspects of the method 600 may substantially correspond to other embodiments described herein, including FIGS. 1-10 and the related descriptions. Method 600 may begin at block 601.

At block 610, the set of compute nodes is structured to include both a first compute node having a first configuration and a second compute node having a second configuration. Structuring can include establishing, constructing, generating, creating, forming, organizing, introducing, or compiling. The first configuration differs from the second configuration. The different configurations can be more than having different processing power capabilities. Accordingly, the set of compute nodes may be considered heterogeneous in nature at block 605. As such, stream computing/processing applications may be run/executed on a cluster of systems that have mixed system typologies. The ability to construct the cluster to run stream applications out of a variety of system types may provide flexibility (e.g., to an administrator/user). For instance, such ability may be useful in a for a shared pool of configurable computing resources (e.g., a cloud-type resource management system). Such a shared pool may have a variety of host types, or various burdens/costs to using different configurations or host types.

In embodiments, the first configuration includes a first operating system and the second configuration includes a second operating system at block 611. For example, the first configuration may include a Linux (trademark of Linus Torvalds) operating system and the second configuration may include a Windows (Windows is a registered trademark of Microsoft Corporation in the United States and/or other countries) operating system. In embodiments, the first configuration includes a first version/level of a first operating system and the second configuration includes a second version/level of the first operating system at block 613. For example, the first configuration can have Red Hat (Red Hat is a registered trademark of Red Hat, Inc. in the United States and other countries) version 6 and the second configuration can have Red Hat version 7.

In embodiments, the first configuration includes a first hardware architecture and the second configuration includes a second hardware architecture at block 615. For example, the first configuration may use a POWER (trademark of International Business Machines Corporation) or POWER-type processor and the second configuration may use an Intel (trademark of Intel Corporation or its subsidiaries in the U.S. and/or other countries) or Intel-type processor. In embodiments, the first configuration includes a first algorithm based on a first set of computing capabilities of the first compute node and the second configuration includes a second algorithm based on a second set of computing capabilities of the second compute node at block 617. For instance, the first and second configurations may include different algorithm implementations tailored to each execution host's capabilities (e.g., bandwidth factors, disk factors, processor factors, memory factors, software factors).

At block 620, based on the first configuration and the set of processing elements which includes a first processing element, a determination is made to establish the first processing element on the first compute node. Determining can include resolving, computing, or ascertaining. When a job is submitted to a streams runtime, a platform scheduler can process a set of placement constraints on the processing elements. Using the set of placement constraints, a chosen compute node (e.g., the first compute node) of a set of candidate compute nodes may identified and selected for the first processing element to execute a portion of the job on the chosen compute node. Such identification and selection may occur using a controller on the first compute node which analyzes the first configuration. The controller can use such analysis to determine whether the first processing element would be appropriate for the first compute node. Accordingly, the platform scheduler and the controller may exchange information when making the determination. In embodiments, in order for the first processing element to be executed on the first compute node, an executable code image (application bundle) for the job and for the first configuration is made available on the first compute node. In various embodiments, the controller can make the determination independent of the platform scheduler based on the various compute node configurations.

For example, a central scheduler may work with various compute node controllers to determine which operators get fused into which processing elements and which processing elements get allocated to which compute nodes (e.g., based on configuration information provided by the various compute node controllers). Constraints can be processed to determine candidate operator sets to construct processing elements from. From the candidate operator sets, a chosen operator set may be selected from which to construct processing elements. The constraints can be processed to determine the candidate processing elements to compute node allocations. From the candidates, a chosen processing element to compute node allocation may be determined in accordance with configuration information ascertained by various compute node controllers local to individual compute nodes.

For instance, in response to the central scheduler performing its other scheduling phases and determining which processing elements belong on which compute nodes, the controller on the first compute node can then utilize relevant characteristics of itself (e.g., the first configuration) and evaluate it against the criteria of the various variations of processing elements that are in the repository, and select the one that matches the best. Accordingly, the controller on the first compute node (e.g., a local controller) can manage which executable variation runs best on itself without the central scheduler needing to be involved, aware, or keep track of each host's individual characteristics or configuration.

At block 630, the first processing element is established on the first compute node. Establishing may include initiation/commencement of a deployment, placement, installation, or allocation. The controller on the first compute node can initiate execution of the first processing element (e.g., and other processing elements that have been allocated to the first compute node). An appropriate application bundle/executable for the first configuration can be determined (by the controller). In accordance with the determination, the appropriate application bundle/executable for the first processing element for the first configuration can be invoked.

At block 640, based on the second configuration and the set of processing elements which includes a second processing element, a determination may be made to establish the second processing element on the second compute node. The methodology for the determination for the second processing element, second compute node, and second configuration may be similar to or the same as the methodology for the determination for the first processing element, first compute node, and first configuration at block 620 and as described herein. At block 650, the second processing element may be established on the second compute node. The methodology for the establishment of the second processing element on the second compute node may be similar to or the same as the methodology for the establishment of the first processing element on the first compute node at block 630 and as described herein.

In embodiments, the first processing element has a first application bundle which corresponds to the first configuration and the second processing element has a second application bundle which corresponds to the second configuration at block 619. For example, as the processing elements are submitted to run on a specific compute node, the specific compute node can use its controller (and associated self awareness information) to determine which application bundle that it needs to run on itself (e.g., for that configuration/system). As the stream computing/processing application is running, the processing elements may be moved to different hosts (e.g., for load balancing, for high availability). As such, a certain processing element running on the first compute node of the first configuration may be moved to the second compute node of the second configuration (thereby needing to use a different application bundle). In response, the stream computing/processing application can continue running and carrying-out operations (e.g., just as it was before but now on a different type of system) by using/selecting an appropriate application bundle that matches the second configuration. In various embodiments, certain specialized capabilities (e.g., an algorithmic implementation) may be utilized by having the controller of the second compute node select a specialized version of the application bundle for itself that is tailored to take advantage of these capabilities (e.g., a specialized hardware assist component).

Method 600 concludes at block 699. Aspects of method 600 may provide performance or efficiency benefits for managing a stream computing environment. For example, aspects of method 600 may have positive impacts with respect to processing a stream of tuples using a set of processing elements and a set of application bundles. Altogether, performance or efficiency benefits (e.g., load balancing, high availability, error event recovery, stability, speed, computing resource efficiency) may occur when managing a set of compute nodes which have different configurations.

Figure 7:
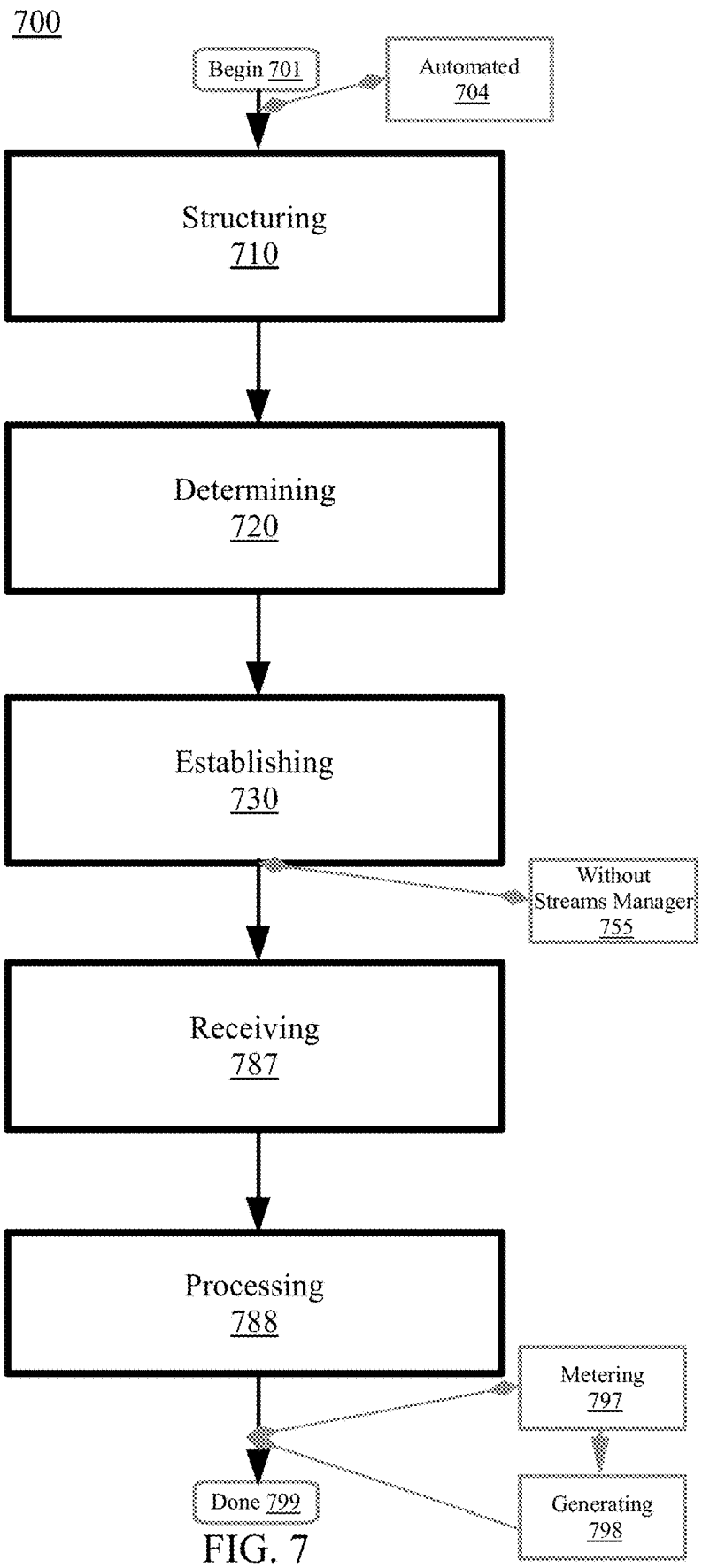
FIG. 7 is a flowchart illustrating a method for managing a set of compute nodes for processing a stream of tuples using a set of processing elements, according to embodiments.

FIG. 7 is a flowchart illustrating a method 700 for managing a set of compute nodes for processing a stream of tuples using a set of processing elements, according to embodiments. Aspects of the method 700 may substantially correspond to other embodiments described herein, including FIGS. 1-10 and the related descriptions. The method 700 may begin at block 701. At block 704, the operational steps such as the structuring, the determining, and the establishing each occur in an automated fashion without user intervention (e.g., fully machine-driven without manual stimuli). At block 710, the set of compute nodes is structured to include both a first compute node having a first configuration and a second compute node having a second configuration. The first configuration differs from the second configuration. Based on the first configuration and the set of processing elements which includes a first processing element, a determination is made at block 720 to establish the first processing element on the first compute node and the first processing element is established on the first compute node at block 730.

In embodiments, based on the second configuration and the set of processing elements which includes a second processing element, a determination is made at block 720 to establish the second processing element on the second compute node and the second processing element is established on the second compute node at block 730. At block 755, a first controller of the first compute node establishes the first processing element on the first compute node without usage of a streams manager. For instance, a local controller on a local host may handle instantiation operations of processing elements and application bundles to the local host without utilizing a centralized administration/deployment/placement engine for components of the streaming environment.

At block 787, a stream of tuples is received. The stream of tuples may be processed by the set of processing elements operating on the set of compute nodes (in a stream application environment). The stream of tuples may be received consistent with the description herein including FIGS. 1-10. Current/future processing by the plurality of processing elements may be performed consistent with the description herein including FIGS. 1-10. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 788. The stream of tuples may be processed by the set of processing elements operating on the set of compute nodes. The stream of tuples may be processed consistent with the description herein including FIGS. 1-10. In embodiments, stream operators operating on the set of compute nodes may be utilized to process the stream of tuples. Processing of the stream of tuples by the set of processing elements may provide various flexibilities for managing the set of compute nodes. Overall flow (e.g., data flow) may be positively impacted by utilizing aspects described herein.

In certain embodiments, a usage assessment may be generated with respect to the first processing element (or the second processing element or the set of processing elements). Use of the first processing element may be metered at block 797. For example, service-life extensions may be measured or functional up-time relative to a benchmark (e.g., historical functional up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 798. The generated invoice may be provided (e.g., displayed in a dialog box, sent or transferred by e-mail, text message, initiated for traditional mail) to the user for notification, acknowledgment, or payment.

Method 700 concludes at block 799. Aspects of method 700 may provide performance or efficiency benefits for managing a stream computing environment. For example, aspects may have positive impacts with respect to processing the stream of tuples using the set of processing elements may be associated with performance or efficiency benefits for managing a set of compute nodes which have different configurations (e.g., speed, flexibility, resource usage, productivity).

Figure 8:
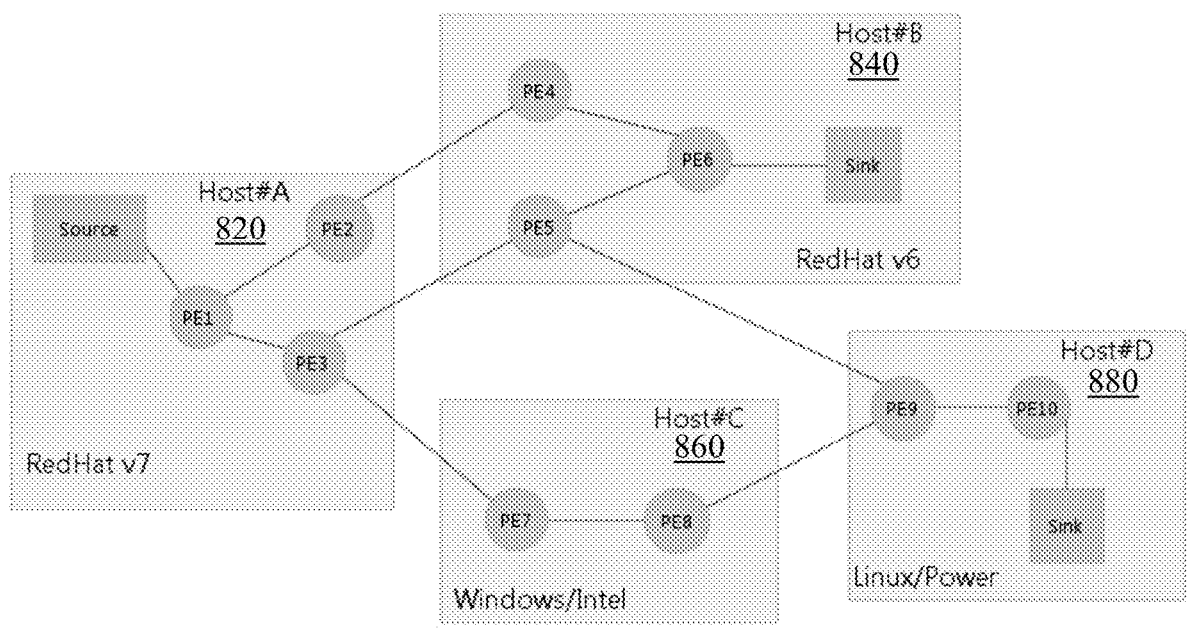
FIG. 8 illustrates an example stream computing environment having a set of compute nodes which have different configurations, according to embodiments.

FIG. 8 illustrates an example stream computing environment 800 having a set of compute nodes 820, 840, 860, 880 which have different configurations, according to embodiments. Host # A 820 has a configuration of Red Hat version 7, and PE1, PE2, and PE3 can be configured for such (e.g., use an application bundle configured for operation with Red Hat version 7). Host # B 840 has a configuration of Red Hat version 6, and PE4, PE5, and PE6 can be configured for such (e.g., use an application bundle configured for operation with Red Hat version 6). Host # C 860 has a configuration of a Windows operating system on an Intel hardware processor, and PE7 and PE8 can be configured for such (e.g., use an application bundle configured for operation with the Windows operating system on the Intel hardware processor). Host # D 880 has a configuration of a Linux operating system on a Power hardware processor, and PE9 and PE10 can be configured for such (e.g., use an application bundle configured for operation with the Linux operating system on the Power hardware processor). Accordingly, the ability to create an environment running the streams application out of a variety of system types can provide various performance or efficiency benefits such as flexibility. In particular, benefits may be realized in cloud-type resource management systems a variety of host types may exist (e.g., with various burdens/costs to using different host types).

Figure 9:
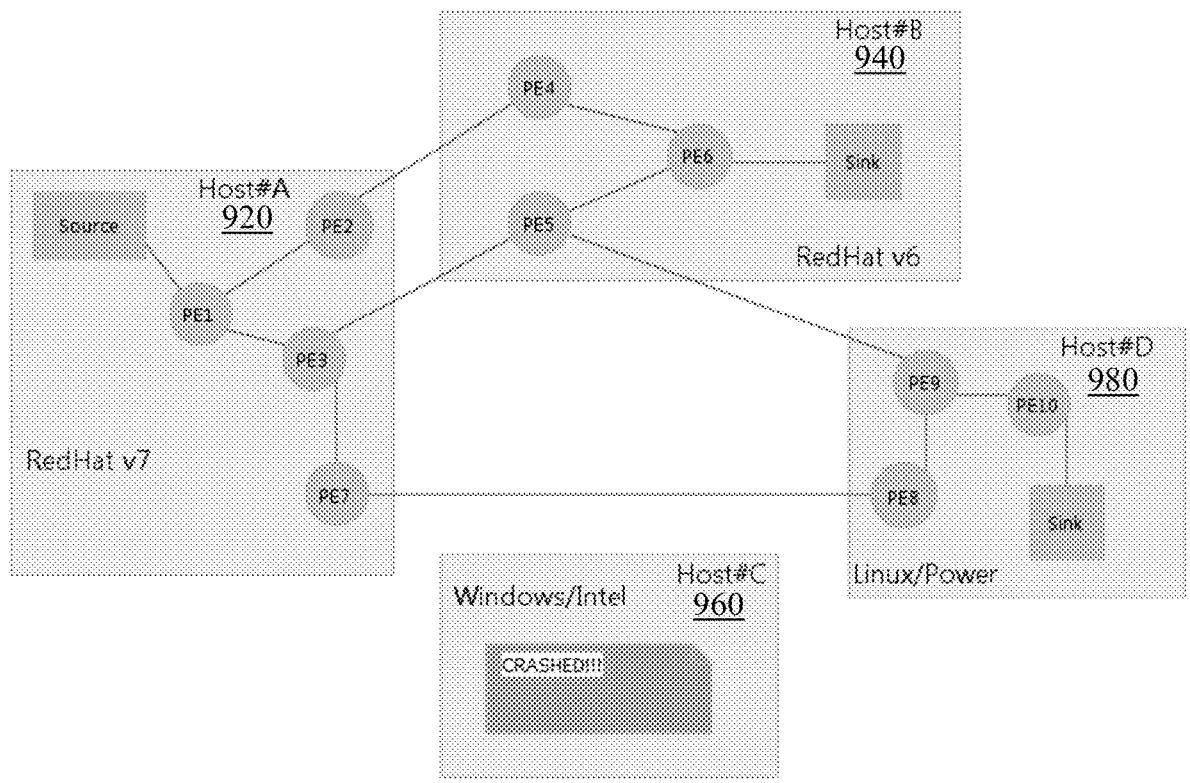
FIG. 9 illustrates an example stream computing environment having a set of compute nodes which have different configurations, according to embodiments.

FIG. 9 illustrates an example stream computing environment 900 having a set of compute nodes 920, 940, 960, 980 which have different configurations and may be substantially similar to the set of compute nodes 820, 840, 860, 880 of the example stream computing environment 800, according to embodiments. Host # A 920 has a configuration of Red Hat version 7, and PE1, PE2, PE3, and PE7 can be configured for such (e.g., use an application bundle configured for operation with Red Hat version 7). Host # B 940 has a configuration of Red Hat version 6, and PE4, PE5, and PE6 can be configured for such (e.g., use an application bundle configured for operation with Red Hat version 6). Host # C 960 has a configuration of a Windows operating system on an Intel hardware processor, and may have succumb to an error event. Host # D 980 has a configuration of a Linux operating system on a Power hardware processor, and PE8, PE9, and PE10 can be configured for such (e.g., use an application bundle configured for operation with the Linux operating system on the Power hardware processor).

When comparing FIG. 8 and FIG. 9, take for example that if Host # C 860 crashed, a streams management service can detect this host failure. In response, the streams management service can resolve that PE7 and PE8 will need to get to moved to another host. A scheduler portion of the management service may determine that the appropriate new host for PE7 is Host # A 920, and that the appropriate new host for PE8 is Host # D 980. Accordingly, PE7 and PE8 functionality may dynamically and seamlessly switch their operating environment in a streamlined fashion without involvement in the switch from streams management services. Accordingly, PE7 will switch from running as a Windows/Intel processing element to a RedHat version 7 processing element and PE8 will switch from Windows/Intel processing element to a Linux/Power processing element.

To illustrate, a triggering event (e.g., host failure, error event) may be detected related to the first compute node (e.g., Host # C 860). The first and second processing elements (e.g., PE7 on Host # C 860 and PE7 on Host # A 920, PE8 on Host # C 860 and PE8 on Host # D 980) may be a same processing element (e.g., PE7, PE8). As such, the same processing element may have switched application bundles which correspond to an appropriate configuration for its host on which it is running. For instance, the first processing element (e.g., PE7, PE8) may a first application bundle which corresponds to the first configuration (e.g., Host # C 860 with the Windows operating system on the Intel hardware processor). The triggering event may be detected related to the first compute node (e.g., Host # C 860/960). Based on the second configuration (e.g., of Host # A 920, of Host # D 980) and the set of processing elements which includes the first processing element, it can be determined to establish the first processing element on the second compute node (e.g., PE7 on Host # A 920, PE8 on Host # D 980). Accordingly, the first processing element may be established on the second compute node (e.g., PE7 on Host # A 920, PE8 on Host # D 980). A second application bundle which corresponds to the second configuration (e.g., for Red Hat version 7 for PE7, for Linux/Power for PE8) may be installed on the second compute node.

Figure 10:
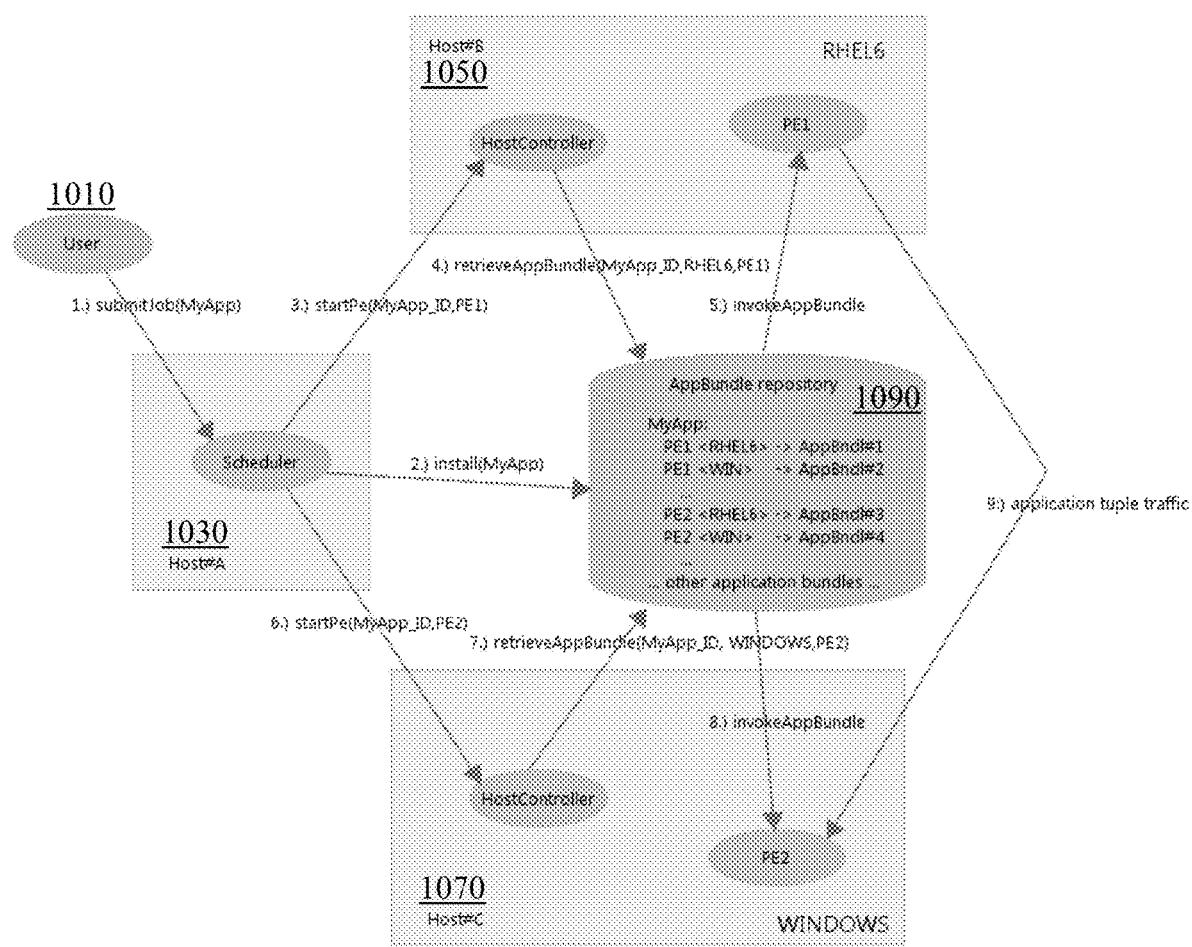
FIG. 10 illustrates an example stream computing environment having a set of compute nodes which have different configurations, according to embodiments.

FIG. 10 illustrates an example stream computing environment 1000 having a user 1010 and a set of compute nodes 1030, 1050, 1070 which may have different configurations, according to embodiments. User 1010 may submit a job with a global application bundle (e.g., a super application bundle). The job can be received by a scheduler of Host # A 1030. The scheduler may initiate installation of the global application bundle to an application bundle repository 1090. In embodiments, separate bundle artifacts may be sorted-out of the global application bundle for the various configurations. In certain embodiments, the application bundle repository 1090 may be pre-populated directly by the compiler on an individual bundle-by-bundle basis prior to job submission.

The global application bundle may include versions/variants of specific application bundles for various configurations and related to various processing elements. Accordingly, a set of application bundles (e.g., contents of the global application bundle) may be produced by a compiler for operation within both a first and a second configurations. As such, the set of application bundles may be one (global) application bundle having configurations for: different operating systems, different versions of an operating system, different hardware architectures, or the like.

For example, the scheduler can initiate start-up of a first processing element on Host # B 1050 using a host controller on Host # B 1050. The host controller on Host # B 1050 may submit a retrieve request or retrieve a particular application bundle for Red Hat version 6 and the first processing element from the application bundle repository 1090 (e.g., a first controller of the first compute node may retrieve a first application bundle). The particular application bundle for Red Hat version 6 and the first processing element may be invoked on Host # B 1050 from the application bundle repository 1090 (e.g., the first controller of the first compute node may install the first application bundle). The scheduler may invokes a startPE operation on a particular host by passing along an application identifier and a processing element identifier. The scheduler may be indifferent (e.g., unaware) with respect to what version/variant of bundles are needed by which hosts.

Similarly, the scheduler can initiate start-up of a second processing element on Host # C 1070 using a host controller on Host # C 1070. The Host controller on Host # C 1070 can check to see if a particular application bundle for Windows and the second processing element is already installed on Host # C 1070. In response to it not being installed, the host controller on Host # C 1070 may submit a retrieve request or retrieve the particular application bundle for Windows and the second processing element from the application bundle repository 1090. The particular application bundle for Windows and the second processing element may be invoked on Host # C 1070 from the application bundle repository 1090. Once the particular bundle is installed, the processing element is started. A stream of tuples may flow from the first processing element on Host # B 1050 to the second processing element on Host # C 1070.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a set of heterogeneous compute nodes for processing a stream of tuples using a set of processing elements, the method comprising:

structuring the set of compute nodes to include both a first compute node having a first configuration and a second compute node having a second configuration, wherein the first configuration differs from the second configuration;

determining, by a first controller on the first compute node, based on the first configuration and the set of processing elements which includes a first processing element, to establish the first processing element on the first compute node,
  wherein one or more stream operators are utilized to form one or more processing elements;

establishing the first processing element on the first compute node;

determining, by a second controller on the second compute node, based on the second configuration and the set of processing elements which includes a second processing element, to establish the second processing element on the second compute node;

establishing the second processing element on the second compute node;

associating the established first processing element with a first application bundle corresponding to the first configuration and the established second processing element with a second application bundle corresponding to the second configuration;

submitting the associated first processing element and associated second processing element to run on a specific compute node,
  wherein the specific compute node utilizes a controller associated with the specific compute node and a plurality of self-awareness information associated with the specific compute node to determine an application bundle associated with the specific compute node to run a configuration associated with the specific compute node,
  wherein one or more processing elements is moved to one or more different hosts as a stream computing application is running,
    wherein each of the different hosts from the one or more different hosts are associated with two or more specific compute nodes;

metering use of the first processing element and the second processing element;

generating an invoice based on comparing the metered use to a benchmark; and presenting the generated invoice to a user.

2. The method of claim 1, wherein the first configuration includes a first operating system, and wherein the second configuration includes a second operating system.

3. The method of claim 1, wherein the first configuration includes a first version of a first operating system, and wherein the second configuration includes a second version of the first operating system.

4. The method of claim 1, wherein the first configuration includes a first hardware architecture, and wherein the second configuration includes a second hardware architecture.

5. The method of claim 1, wherein the first configuration includes a first algorithm based on a first set of computing capabilities of the first compute node, and wherein the second configuration includes a second algorithm based on a second set of computing capabilities of the second compute node.

6. The method of claim 1, wherein the first processing element has a first application bundle which corresponds to the first configuration, and wherein the second processing element has a second application bundle which corresponds to the second configuration.

7. The method of claim 1, further comprising:
detecting a triggering event related to the first compute node, wherein the first and second processing elements are a same processing element.

8. The method of claim 1, wherein the first processing element has a first application bundle which corresponds to the first configuration, further comprising:
detecting a triggering event related to the first compute node;
determining, based on the second configuration and the set of processing elements which includes the first processing element, to establish the first processing element on the second compute node;
establishing the first processing element on the second compute node; and
installing, on the second compute node, a second application bundle which corresponds to the second configuration.

9. The method of claim 1, further comprising:
retrieving, by a first controller of the first compute node, a first application bundle; and
installing, by the first controller of the first compute node, the first application bundle.

10. The method of claim 1, further comprising:
producing, by a compiler, a set of application bundles for operation within both the first and second configurations.

11. The method of claim 10, wherein the set of application bundles is one application bundle having configurations for: different operating systems, different versions of an operating system, and different hardware architectures.

12. The method of claim 1, wherein a first controller of the first compute node establishes the first processing element on the first compute node without usage of a streams manager.

13. The method of claim 1, wherein the structuring, the determining, and the establishing each occur in an automated fashion without user intervention.

14. The method of claim 1, further comprising:
receiving the stream of tuples to be processed by the set of processing elements operating on the set of compute nodes; and
processing, using the set of processing elements operating on the set of compute nodes, the stream of tuples.

15. A system for managing a set of heterogeneous compute nodes for processing a stream of tuples using a set of processing elements, the system comprising:
a memory having a set of computer readable computer instructions, and a processor for executing the set of computer readable instructions, the set of computer readable instructions including:
structuring the set of compute nodes to include both a first compute node having a first configuration and a second compute node having a second configuration, wherein the first configuration differs from the second configuration;
determining, by a first controller on the first compute node, based on the first configuration and the set of processing elements which includes a first processing element, to establish the first processing element on the first compute node,
  wherein one or more stream operators are utilized to form one or more processing elements;

establishing the first processing element on the first compute node;

determining, by a second controller on the second compute node, based on the second configuration and the set of processing elements which includes a second processing element, to establish the second processing element on the second compute node;

establishing the second processing element on the second compute node;

associating the established first processing element with a first application bundle corresponding to the first configuration and the established second processing element with a second application bundle corresponding to the second configuration;

submitting the associated first processing element and associated second processing element to run on a specific compute node,
  wherein the specific compute node utilizes a controller associated with the specific compute node and a plurality of self-awareness information associated with the specific compute node to determine an application bundle associated with the specific compute node to run a configuration associated with the specific compute node,
  wherein one or more processing elements is moved to one or more different hosts as a stream computing application is running,
    wherein each of the different hosts from the one or more different hosts are associated with two or more specific compute nodes;

metering use of the first processing element and the second processing element;

generating an invoice based on comparing the metered use to a benchmark; and presenting the generated invoice to a user.

16. A computer program product for managing a set of heterogeneous compute nodes for processing a stream of tuples using a set of processing elements, the computer program product comprising a computer readable storage medium having program instructions embodied therewith, wherein the computer readable storage medium is not a transitory signal per se, the program instructions executable by a processor to cause the processor to perform a method comprising:

structuring the set of compute nodes to include both a first compute node having a first configuration and a second compute node having a second configuration, wherein the first configuration differs from the second configuration;

determining, by a first controller on the first compute node, based on the first configuration and the set of processing elements which includes a first processing element, to establish the first processing element on the first compute node,
  wherein one or more stream operators are utilized to form one or more processing elements;

establishing the first processing element on the first compute node;

determining, by a second controller on the second compute node, based on the second configuration and the set of processing elements which includes a second processing element, to establish the second processing element on the second compute node;

establishing the second processing element on the second compute node;

associating the established first processing element with a first application bundle corresponding to the first configuration and the established second processing element with a second application bundle corresponding to the second configuration;

submitting the associated first processing element and associated second processing element to run on a specific compute node,
  wherein the specific compute node utilizes a controller associated with the specific compute node and a plurality of self-awareness information associated with the specific compute node to determine an application bundle associated with the specific compute node to run a configuration associated with the specific compute node,
  wherein one or more processing elements is moved to one or more different hosts as a stream computing application is running,
    wherein each of the different hosts from the one or more different hosts are associated with two or more specific compute nodes;

metering use of the first processing element and the second processing element;

generating an invoice based on comparing the metered use to a benchmark; and presenting the generated invoice to a user.

17. The computer program product of claim 16, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to a remote data processing system for use in the computer readable storage medium with the remote data processing system.

* * * * *